United States Patent
Morita et al.

[11] Patent Number: 6,103,818
[45] Date of Patent: Aug. 15, 2000

[54] RESIN COMPOSITION AND HEAT-RESISTANT, RETURNABLE IC TRAY OBTAINED BY MOLDING THE SAME

[75] Inventors: Atsushi Morita; Masaji Yoshimura; Hiroyasu Kido; Tomoaki Sato; Kouichi Sano, all of Kanagawa, Japan; Denis Dean Springer; Daniel Patrick Sheehy, both of Austin, Tex.

[73] Assignees: Mitsui Chemicals, Inc., Japan; Minnesota Mining & Manufacturing Company, Austin, Tex.

[21] Appl. No.: 09/131,201

[22] Filed: Aug. 7, 1998

[51] Int. Cl.[7] .................................................. C08L 79/08
[52] U.S. Cl. ........................ 524/606; 524/449; 524/607; 524/847
[58] Field of Search ................................ 524/449, 847, 524/606, 607

[56] References Cited

U.S. PATENT DOCUMENTS

| | | | |
|---|---|---|---|
| 5,004,774 | 4/1991 | Yeo et al. | |
| 5,087,644 | 2/1992 | Tsutsumi et al. | 523/205 |
| 5,104,581 | 4/1992 | Ito et al. | 252/511 |
| 5,466,737 | 11/1995 | Oki et al. | 524/495 |
| 5,789,523 | 8/1998 | Georhe et al. | 524/602 |
| 5,837,767 | 11/1998 | Shimokusuzuno et al. | 524/497 |

FOREIGN PATENT DOCUMENTS 0111327A  6/1984  European Pat. Off. .

OTHER PUBLICATIONS

Database WPI, Section Ch, Week 198729, Derwent Publications Ltd., GB; Class A26, An 1987–203632, XP002122402 & JP 62 132960 A (Yobear Rulon Kogyo), Jun. 16, 1987, *abstract; claims 1–10*.

Brady et al., Materials Handbook, 12th Edition, McGraw–Hill, p. 503, 1986.

Domininghaus, Plastics for Engineers, Hanser, p. 556, 1988.

*Primary Examiner*—David W. Wu
*Assistant Examiner*—Ling Sui Choi
*Attorney, Agent, or Firm*—Burns, Doane, Swecker & Mathis, L.L.P.

[57] ABSTRACT

A resin composition containing components (A), (B), (C) and (D) wherein component (A) is a resin composition containing a thermoplastic polyimide resin, component (B) is carbon fiber, component (C) is mica, component (D) is an internal mold-releasing agent, and relative to 100 parts by weight of component (A), component (B) is from 1 to 80 parts by weight, component (C) 1 to 100 parts by weight, and component (D) is 0.1 to 50 parts by weight.

2 Claims, 1 Drawing Sheet

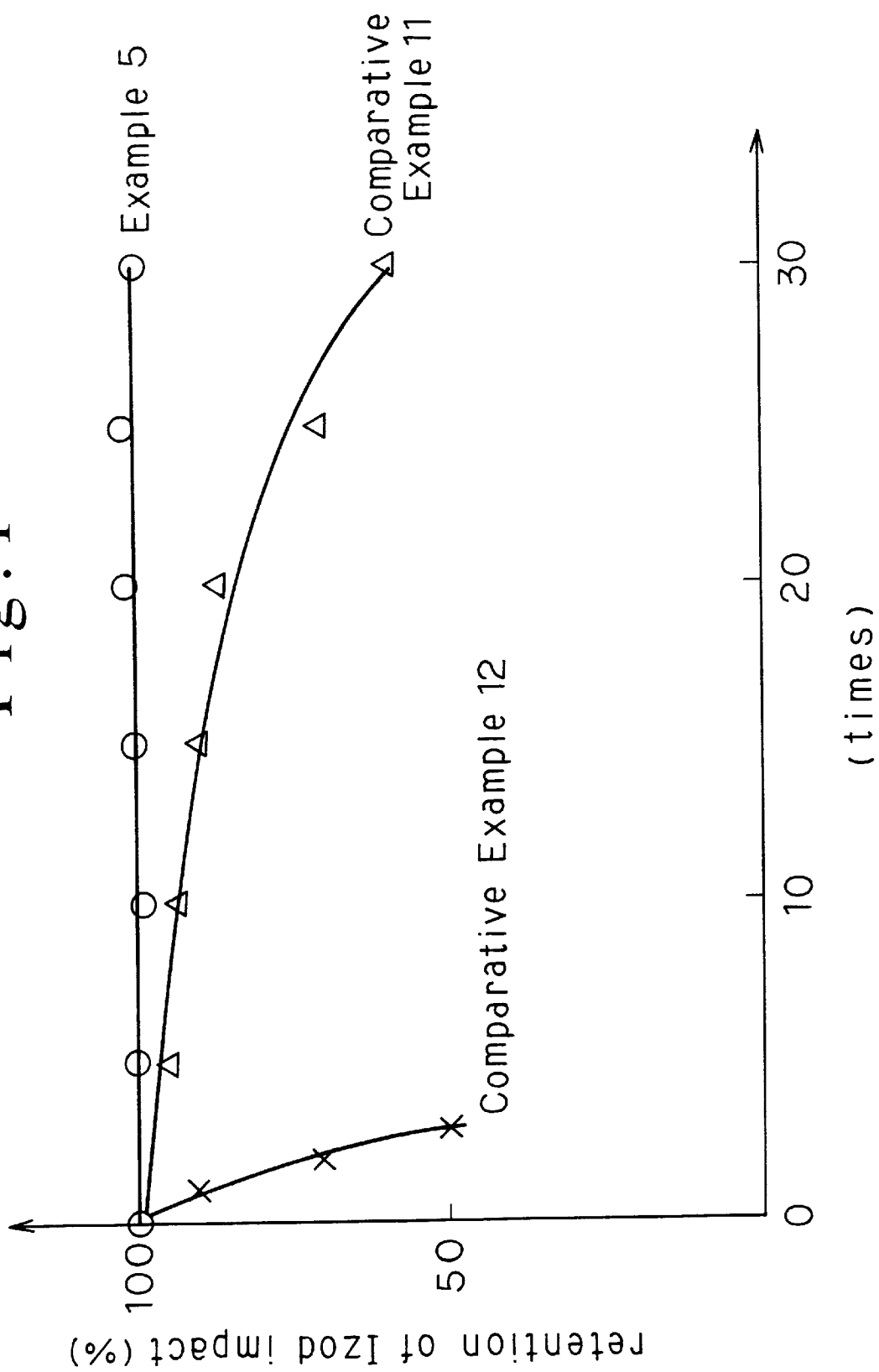

RESIN COMPOSITION AND HEAT-RESISTANT, RETURNABLE IC TRAY OBTAINED BY MOLDING THE SAME

BACKGROUND OF THE INVENTION

1. Field of the Invention

The present invention relates to a returnable IC tray having an antistatic property and a high heat-resistant property, excellent in mechanical characteristics, free from warpage and deformation, and reusable, and a resin composition for giving the same.

2. Description of the Prior Art

Trays for heat treatment of IC are used in the field of electric and electronic engineering. Especially for conveying, or drying for dehydrating IC parts, trays which were produced by molding a composition consisting essentially of a polyphenylene ether resin, a polyether imide resin or a polysulfone resin have heretofore been used. Regarding the heat resistance property of these IC trays for dehydrating IC parts, the trays being resistive at a temperature of below 200° C. were satisfactory.

Recently, however, use of trays under higher temperature, for example, the trays for a reflow soldering step which is to be effected at a temperature higher than 200° C. has been required. In such use, compositions consisting essentially of a polyphenylene ether resin, a polyether imide resin or a polysulfone resin could not be practicable, because their heat-resistant property was not sufficient. Therefore, in the treatment of IC parts at a temperature higher than 200° C., IC trays made of metal (aluminum) were used. However, metallic IC trays are defective in that they can not be produced in industrial-scale injection molding, are difficult to be processed, expensive, and heavier than the resinous trays. Accordingly, resinous IC trays which are light in weight, capable of being produced at low costs and capable of being substitutable for such use of metallic ones have been desired. In such a situation, use of thermoplastic polyimide resins which have the highest heat-resistant property among thermoplastic resins may be taken into consideration. In such a use, in general, since there exist many cases where the surface resistivity of the molded parts should be controlled in order to make the molded parts antistatic, it is important to improve this characteristic of the molded parts.

In general, to control the surface resistivity of thermoplastic resins, employed is a technique of adding conductive carbon thereto by kneading them together. In this technique, however, there happen many cases in which the carbon would drop off from the formed resin molded parts when the molded parts are contacted with and rubbed against electronic parts (in other words, the molded parts are worn out at the contacted area), which resulted in the dropped-out carbon would penetrating into the insulating area of the electronic parts and thereby interfering with the insulation in the area. Thus, in some cases, use of carbon is often problematic. Specifically, for reuse of IC trays, it is necessary that they are not deformed and worn out while they are repeatedly reused.

On the other hand, there exists a technique of adding carbon fiber to thermoplastic resins by kneading them together, which could be free from the problem noted above, however, is problematic in another respect in that the orientation of carbon fiber, if occurred, in the resin molded parts induces anisotropic shrinkage which might cause warpage of the molded parts.

In addition, for IC trays and other molded parts having complicated forms, it is relatively difficult to release them from molds, and if they are released by force from molds, they will be warped.

Moreover, it is further desired to use IC trays at an ultra-high temperature of 250° C. or higher. However, no resin materials for IC trays capable of being used at such a high temperature have heretofore been known.

Finally, the mechanical characteristics of IC trays which are obtained by molding a composition consisting essentially of a polyphenylene ether resin, a polyetherimide resin or a polysulfone resin are worsened while the trays are used for a long period of time. Specifically, the long-term heat-resistant property of these IC trays is poor. For example, IC trays of polyphenylene ether could hardly be reused at 150° C. Even if could possible, they could not be reused 30 times. Given such a situation, desired are reusable, returnable, resinous IC trays which are capable of being reused even at a high temperatures of 200° C. or higher (of course, are also capable of being reused at temperatures lower than 200° C.).

SUMMARY OF THE INVENTION

In consideration of the problems noted above, the object of the present invention is to provide a returnable IC tray having an antistatic property and a high heat-resistant property, excellent in mechanical characteristics, free from warpage and deformation, having good abrasion resistance, and reusable repeatedly; and a resin composition for giving the same.

The present inventors have intensively studied to attain the above object, and, as a result, have found a novel resin composition having the intended properties, and have completed the present invention.

Specifically, the present invention relates to the following:

(a) A resin composition comprising components (A), (B), (C) and (D), wherein,
  component (A) is a resin composition comprising a thermoplastic polyimide resin,
  component (B) is carbon fiber,
  component (C) is mica,
  component (D) is an internal mold-releasing agent, and, relative to 100 parts by weight of component (A),
  component (B) is from 1 to 80 parts by weight,
  component (C) is from 1 to 100 parts by weight, and
  component (D) is from 0.1 to 50 parts by weight.

(b) The resin composition of (a), wherein the thermoplastic polyimide resin comprised in component (A) has a repeating structure unit of formula (1):

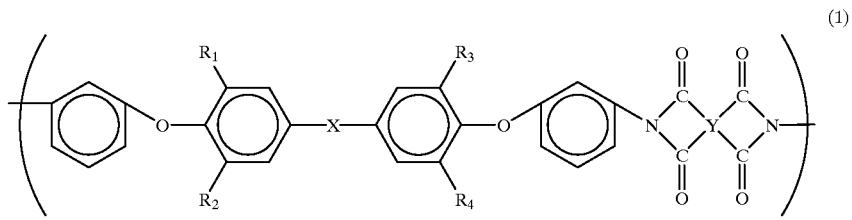

wherein X represents a direct bond, or a group selected from the group consisting of $-SO_2-$, $-CO-$, $-C(CH_3)_2-$, $-C(CF_3)_2-$, and $-S-$; $R_1$, $R_2$, $R_3$ and $R_4$ each independently represents a hydrogen atom, an alkyl group, an alkoxy group, a halogenoalkyl group, a halogenoalkoxy group, or a halogen atom; and Y represents one or more than one groups selected from the group of formula (2):

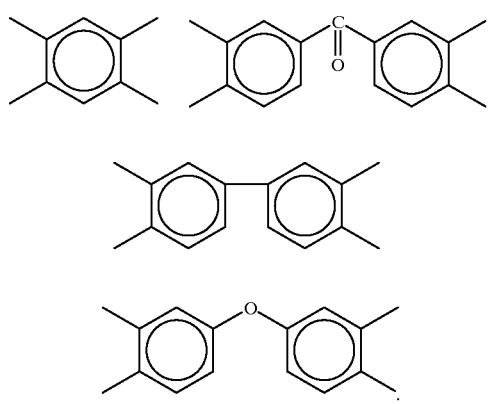

(When Y is more than one groups, this means that the polyimide resin has more than one kinds of repeating structure units of formula (1) wherein each Y represents a different group of formula (2) from each other.)

(c) The resin composition of (a) or (b), wherein the thermoplastic polyimide resin comprised in component (A) has a logarithmic viscosity falling within a range of 0.35 to 0.60 dl/g.

(d) The resin composition of (a), wherein the carbon fiber is the fiber which is obtained by calcining polyacrylonitrile.

(e) The resin composition of (a), which contains the carbon fiber in an amount of from 5 to 50 parts by weight.

(f) The resin composition of (a), which contains the mica in an amount of from 5 to 50 parts by weight.

(g) The resin composition of (a), in which the amount of the internal mold-lubricating agent added thereto is from 1 to 30 parts by weight.

(h) The resin composition of (a), wherein the internal mold-releasing agent is a fluororesin (fluorocarbon resin).

(i) A returnable IC tray having heat-resistant property, which is obtained by molding the resin composition of any one of (a) to (h).

(j) An IC tray substantially free from warpage after exposure to temperatures of up to about 235° C.

(k) The IC tray as mentioned in (j), which is obtained by molding the resin composition of any one of (a) to (h).

The resin composition of the present invention gives reusable, returnable parts which are antistatic and highly resistant to heat, have good mechanical characteristics, are free from warpage or deformation, and have good abrasion resistance. It has many applications in a broad range, and has high market value. In particular, the composition is useful in the field of electric and electronic engineering.

BRIEF DESCRIPTION OF THE DRAWING

FIG. 1 shows cold-hot cycle test data for Izod impact values obtained with respect to the resin compositions of Example 5, and Comparative Examples 11 and 12.

PREFERRED EMBODIMENTS OF THE INVENTION

The component (A) in the resin composition of the present invention is a resin composition comprising a thermoplastic polyimide resin. Preferably, the thermoplastic polyimide resin has repeating structure units of formula (1). Specifically, it can be produced by reacting a ether diamine of the following formula (3) with a tetracarboxylic acid dianhydride of the following formula (4) in the presence or absence of an organic solvent to obtain a polyamide acid, followed by chemically or thermally imidating the obtained polyamide acid.

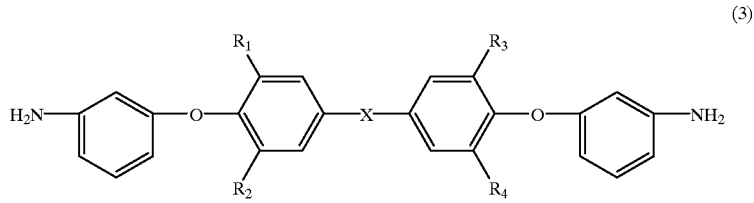

wherein X, $R_1$, $R_2$, $R_3$ and $R_4$ have the same meanings as in formula (1)

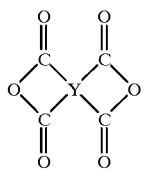

(4)

wherein Y has the same meaning as in formula (1).

One or more of these ether diamines or tetracarboxylic acid anhydrides can be used either singly or as combined, and can be further combined with any other comonomers within the range not interfering with the object of the present invention. If desired, a plurality of thermoplastic polyimide resins as obtained from different monomers can be blended to give polymer blends for use in the present invention.

The thermoplastic polyimide resin is not specifically defined. However, more preferred is the thermoplastic polyimide resin of the following formula (5) (AURUM PD400, PD450, PD500, PL400, PL450, PL500, PD6200, PL6200, etc.; trade names of products manufactured by Mitsui Chemicals, Inc.):

logarithmic viscosity. The terminology of logarithmic viscosity is defined, for example, in "Handbook for Polymer Analysis" (published by Asakura Publishing Co., edited by the Society of Analytical Chemistry of Japan, 1st Ed., 1995, p. 58) or in "Dictionary of Polymers" (published by Asakura Publishing Co., edited by the Polymer Society of Japan, 8th Ed., 1983, p. 516).

The present invention provides a resin composition comprising components (A), (B), (C) and (D), wherein;
component (A) is a resin composition comprising a thermoplastic polyimide resin,
component (B) is carbon fiber,
component (C) is mica,
component (D) is an internal mold-releasing agent, and, relative to 100 parts by weight of component (A),
component (B) is from 1 to 80 parts by weight,
component (C) is from 1 to 100 parts by weight, and
component (D) is from 0.1 to 50 parts by weight.

The amount of carbon fiber to be comprised in the resin composition of the present invention is from 1 to 80 parts by weight relative to 100 parts by weight of component (A), but preferably is from 5 to 60 parts by weight, more preferably from 5 to 50 parts by weight. If the amount is lower than 1

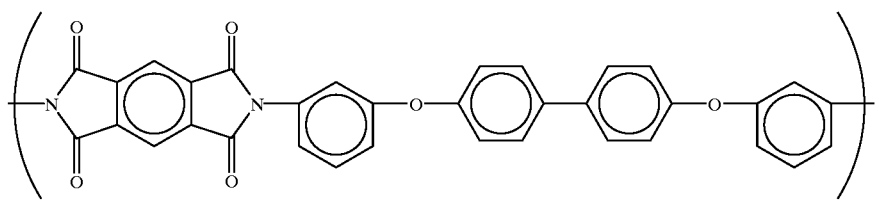

(5)

The thermoplastic polyimide resin of formula (5) has especially good moisture absorption resistance, and IC trays comprising the same are troubled little by foaming during reflow soldering.

It is desirable that the resin composition comprising the thermoplastic polyimide resin of component (A) is in the form of powder or pellets.

In the present invention, the logarithmic viscosity of the thermoplastic polyimide resin comprised in component (A) is not specifically defined, however, preferably is, in general, within the range of 0.35 to 0.60 dl/g, more preferably within the range of 0.40 to 0.55 dl/g.

If its logarithmic viscosity is lower than 0.35, the thermoplastic polyimide resin shall have a reduced molecular weight, often resulting in that the mechanical characteristics of the molded parts comprising the resin are insufficient. On the other hand, if its logarithmic viscosity is higher than 0.60, the thermoplastic polyimide resin shall have an increased molecular weight, often resulting in that the flowability of the resin composition comprising the resin is insufficient to produce IC trays therefrom through injection molding.

Regarding the logarithmic viscosity, polymers having a lower viscosity shall have a lower molecular weight, while those having a higher viscosity shall have a higher molecular weight. To measure the logarithmic viscosity of the resin, in the present invention, the resin is dissolved in a mixed solvent of parachlorophenol/phenol (90/10, by weight) to have a concentration of 0.5 g/100 ml, the obtained resin solution is heated at 200° C., and then cooled to 35° C., whereupon the thus-cooled resin solution is measured for its part by weight, the conductivity of the composition is insufficient, and, in addition, the dimensional shrinkage thereof is too large and the mechanical characteristics thereof are insufficient. If, however, the amount is larger than 80 parts by weight, the moldability of the composition is insufficient so that the composition is difficult to be molded through injection molding.

The amount of mica to be comprised In the resin composition of the present invention is from 1 to 100 parts by weight relative to 100 parts by weight of component (A), but preferably is from 3 to 70 parts by weight, more preferably from 5 to 50 parts by weight. If the amount is lower than 1 part by weight, the molded parts of the composition are unfavorably warped. If, however, the amount is larger than 100 parts by weight, the moldability of the composition is insufficient so that the composition is difficult to be molded through injection molding. Even if it is possible to mold it, the mechanical characteristics will not be sufficient.

The amount of the internal mold-releasing agent to be comprised in the composition of the present invention is from 0.1 to 50 parts by weight relative to 100 parts by weight of component (A), but preferably is from 0.5 to 40 parts by weight, more preferably from 1 to 30 parts by weight. If the amount is lower than 0.1 part by weight, 1) the molded parts formed from the composition through injection molding are difficult to be released from the mold, or that is, the releasability of the molded parts is not enough. In this case, If the molded parts are released by force from the mold, they are unfavorably warped; 2) the abrasion resistance of the molded parts becomes significantly poor, which is therefore also unfavorable.

On the other hand, if the amount of the internal mold-releasing agent is higher than 50 parts by weight, the molded parts of the composition are brittle and, in addition, they are peeled off near the gate.

The type of carbon fiber to be used in the present invention is not specifically defined, but preferably is the carbon fiber which is obtained through calcination of polyacrylonitrile. Pitch-based carbon fiber which is obtained by melt-spinning petroleum pitch or coal pitch may have insufficient elasticity when compared with the carbon fiber of the above preferred type.

No particular limitation is imposed upon the mean fiber length of the carbon fiber to be used as one of the raw materials in the present invention, but it is preferably between 3 mm and 7 mm. No particular limitation is also imposed upon the mean fiber diameter of the carbon fiber to be used, but is preferably within a range of 6 $\mu$m to 15 $\mu$m.

No particular limitation is imposed upon the weight-average value of aspect ratio of mica for use in the present invention, but it is, in general, preferably within a range of 20 to 300. The aspect ratio referred to herein indicates a ratio of diameter/thickness of grains.

The internal mold-releasing agent for use in the present invention is an indispensable component for improving the releasability of the molded parts from molds in injection molding. When it is used in a specifically defined amount along with carbon fiber, the internal mold-releasing agent also functions to improve the durability of IC trays made from the composition. This is because a combination of internal mold releasing agent and carbon fiber improves the abrasion resistance of the IC trays. No particular limitation is imposed upon the internal mold-releasing agent to be used in the present invention, but it is, in general, preferably selected from fluororesins (fluorocarbon resins), oils, and high-density and/or low-density polyethylenes (HDPE, LDPE). Among the above, most preferred are fluororesins.

The fluororesin for use in the present invention is preferably at least one kind selected from the group consisting of following ① to ⑥.

① Tetrafluoroethylene resin having a repeating structure unit of —(CF$_2$CF$_2$)— in the molecule.

② Tetrafluoroethylene-hexafluoropropylene copolymer resin having repeating structure units of —(CF$_2$CF$_2$)— and —[CF(CF$_3$)CF$_2$]— in the molecule.

③ Tetrafluoroethylene-perfluoroalkylvinyl ether copolymer resin having repeating structure units of —(CF$_2$CF$_2$)— and [CF(OC$_m$F$_{2m+1}$) CF$_2$]— (where m indicates a positive integer) in the molecule.

④ Tetrafluoroethylene-ethylene copolymer resin having repeating structure units of —(CF$_2$CF$_2$)— and —(CH$_2$CH$_2$)— in the molecule.

⑤ Trifluorochloroethylene-ethylene copolymer resin having repeating structure units of —(CH$_2$CH$_2$)— and —(CFClCF$_2$)— in the molecule.

⑥ Vinylidene fluoride resin having a repeating structure unit of —(CF$_2$CH$_2$)— in the molecule.

Among the above fluororesins, more preferred is resin ①. This is because the composition of the present invention requires a temperature of at the lowest 350° C. or higher for its injection molding, and, as the case may be, often requires a higher temperature falling within a range of 390 to 430° C. Therefore, especially preferred are a fluororesin having good thermal stability and heat degradation resistance.

If desired, the composition of the present invention may contain a suitable amount of any other thermoplastic resins, depending on its object. The additional thermoplastic resin capable of being incorporated into the composition includes, for example, high-density and/or low-density polyethylenes (HDPE, LDPE), polypropylene, polystyrene, polycarbonate, polyester, polyamide, polyamide-imide, polyphenylene-ether, polyacetal, polyarylate, polyether-nitrile, polyphenylene-sulfide, polysulfone, polyether-sulfone, polyether-imide, polyether-ketone, polyether-ether-ketone, polyether-ketone-ketone, polyether-ketone-ether-ketone-ketone, liquid crystal polymer, etc.

In addition, the composition may further contain thermosetting resin and non-flaky filler within the range not interfering with the object of the present invention. The thermosetting resin includes, for example, phenolic resin, epoxy resin, etc. The filler includes, for example, an abrasion-resistance improver such as silica powder, molybdenum disulfide, etc.; a reinforcing material such as glass fiber, aromatic polyamide fiber, alumina fiber, boron fiber, silicon carbide fiber, potassium titanate whiskers, aluminium borate whiskers, carbon whiskers, metal fiber, ceramic fiber, etc.; a flame retardancy improver such as antimony trioxide, magnesium carbonate, calcium carbonate, etc.; an anti-tracking improver such as asbestos, silica, etc.; an acid resistance improver such as barium sulfate, silica, calcium metasilicate, etc.; a thermal conductivity improver such as iron powder, zinc powder, aluminum powder, copper powder, etc.; and others such as glass beads, diatomaceous earth, alumina, shirasu balloons, hydrated alumina, hydrotalcite, zeolite, various metal oxides, etc.

Colorants, stabilizers and plasticizers may also be added to the composition within the range not interfering with the effect of the present invention.

The resin composition of the present invention can be produced in any ordinary manner for continuous production, which comprises uniformly mixing the components (A), (B), (C) and (D) and other optional components, followed by processing the resulting mixture, for example, in a single-screw or multi-screw extruder.

The molded parts of the present invention can be used in an atmosphere generally at a temperature up to 250° C. At a temperature higher than 250° C., however, the molded parts may also be used at such a high temperature of up to 330° C., if they are post-crystallized.

The resin composition of the present invention is put into practical use, after having been molded in any ordinary method of injection molding, extrusion molding, compression molding, transfer molding or the like. In particular, the composition is effectively used for producing large-area, tabular molded parts such as IC trays which will be demonstrated in the following Examples. The trays produced are widely used for heat treatment of IC in the form of QFP (Quad Flat L-Leaded Package), SOP (Small Outline L-Leaded Package), PGA (Pin Grid Array Package), BGA (Ball Grid Array Package) and others.

Now, the present invention is described concretely with reference to the following Examples, which, however, are not intended to restrict the scope of the invention. The physical properties of the resins in Examples and Comparative Examples were measured and evaluated according to the methods mentioned below.

(1) Test for warpage of molded parts and for warpage at high temperature:

A molding sample of the resin composition of the present invention (an IC tray having a size of 300 mm×150 mm×10 mm height and having a wall thickness of 2 mm, for which the resin is injected into a mold through one direct gate provided in the center of the mold) was put on a base plate, and its warpage was measured using a height meter. Next, this IC tray was put in an oven at 230° C. for 3 minutes, then taken out, and cooled, and its warpage was measured. One molding sample was repeatedly subjected to this heat-cycle test for a total of 30 times, and its warpage was also measured.

(2) Impact resistance of tray:

A tray sample was dropped onto a surface of concrete from a height of 2 m for a total of three times, and it was checked as to whether or not the sample was broken. The broken sample was evaluated as bad(X), and the non-broken sample was evaluated as good(O).

(3) Abrasion resistance test:

The test was measured in accordance with JIS K-7204. Precisely, a disc sample having a size of 100 mm diameter ×3 mm thickness was applied to an abrasion-test wheel of CS17 under a load of 1000 g, and the abrasion loss of the resin composition was measured after 1000 revolutions of the resin disc. The smaller value of the abrasion loss obtained herein indicates better abrasion resistance of the sample.

(4) Surface resistivity:

The surface resistivity of the same IC tray sample as in (1) above was measured at 23° C. and at a relative humidity of 50%, using a surface high resistance meter(Hirestor; trade name of the product manufactured by Mitsubishi Chemical Co.). In the measurement, the voltage applied was 500 V, and the terminal-to-terminal distance was 20 mm. Those having a surface resistivity of smaller than E12 Ω ($10^{12}$ Ω) are satisfactorily used as IC trays.

(5) Mold releasing pressure

When producing the same IC trays as those in (1) above through injection molding, the mold-releasing pressure was measured with a pressure sensor which was set in one ejector pin.

(6) Cold-hot cycle test for Izod impact value:

An Izod test sample was put in an oven at 230° C. for 3 minutes, taken out and cooled to room temperature, and an Izod impact value of the sample was measured. To check returnability of the sample, one and the same sample was repeatedly subjected to this test for a total of 30 times, and an Izod impact value of the sample was measured. The Izod impact value of the sample not subjected to the heat treatment was standardized as to be 100, which was referred to as the value of 0(zero)-time test. 30 times heat treatment was carried out, and the Izod impact value of each time of the heat-treated sample was divided by that of the same sample not subjected to the heating test (0-time sample), and then multiplied by 100 to obtain the data for the each time of the heat-treated sample. Izod impact was measured in accordance with ASTM D 256. In this test, used were the resin compositions of Example 5, and Comparative Examples 11 and 12. The data obtained are shown in FIG. 1.

EXAMPLE 1

Thermoplastic polyimide resin powder having the structure of formula (5) (AURUM PD450; trade name of the product manufactured by Mitsui Chemicals, Inc.) as component (A); carbon fiber (Besfight HTA-C6; trade name of the product manufactured by Toho Rayon Co.) as component (B); mica (S-200; trade name of the product manufactured by Repco Inc.) as component (C); and tetrafluoroethylene resin (PTFE KTL610; trade name of the product manufactured by Kitamura Co.) as component (D) were formulated in the ratio shown in Table 1, then well mixed in a tumbler mixer, further mixed in melt in a double-screw extruder (screw diameter: 37 mm; L/D=32) at 420° C. and at a screw revolution of 80 rpm, and extruded therefore to give pellets. In this extrusion, the carbon fiber was fed into the extruder through a side feeder. The thus-extruded pellets were then molded into IC rays, sample plates for abrasion test, and specimens for Izod impact testing, and evaluated in the manner mentioned above. The test results are shown in Table 1.

EXAMPLES 2–5, and 7–9

Resin compositions shown in Tables 1 and 2 were molded and tested in the same manner as in Example 1.

EXAMPLE 6

The same procedure and tests as in Example 5 was repeated except that mica (S-60H; trade name of the product manufactured by Repco Inc.) was used as component (C).

EXAMPLE 10

The same procedure and tests as in Example 5 was repeated except that thermoplastic polyimide resin powder having the structure of formula (5) (logarithmic viscosity= 0.35 dl/g) was used as component (A).

EXAMPLE 11

The same procedure and tests as in Example 5 was repeated except that thermoplastic polyimide resin powder having the structure of formula (5) ( logarithmic viscosity= 0.60 dl/g ) was used as component (A).

EXAMPLE 12

The same procedure and tests as in Example 5 was repeated except that thermoplastic polyimide resin powder having the structure of formula (5) (AURUM PD450; trade name of the product manufactured by Mitsui Chemicals, Inc.) as component (A) and polyether-ether-ketone PEEK150P; trade name of the product manufactured by VICTREX Co.) were used as shown in Table 3. The ratio of the components constituting the resin composition used in this example is shown in Table 3.

COMPARATIVE EXAMPLE 1

Thermoplastic polyimide resin powder having the structure of formula (7) (AURUM PD450; trade name of the product manufactured by Mitsui Chemicals, Inc.) and carbon black (Ketjen EC; trade name of the product manufactured by Lion Co.) were kneaded in melt in a double-screw extruder (screw diameter: 37 mm; L/D=32) at 420° C. and at a screw revolution of 80 rpm, and extruded therefrom to give pellets. The thus-extruded pellets were then molded into IC trays, sample plates for abrasion test, and specimens for Izod impact testing, and evaluated in the manner mentioned above. The test results are shown in Table 4.

COMPARATIVE EXAMPLE 2

Thermoplastic polyimide resin powder having the structure of formula (5) (AURUM PD450; trade name of the product manufactured by Mitsui Chemicals, Inc.) and carbon fiber (Besfight HTA-C6; trade name of the product manufactured by Toho Rayon Co.) were mixed in melt in the ratio shown in Table 4, in a double-screw extruder (screw diameter: 37 mm; L/D=32) at 420 ° C. and at a screw revolution of 80 rpm, and extruded therefore to give pellets. In this extrusion, the carbon fiber was fed into the extruder through a side feeder. The thus-extruded pellets were then molded into IC trays, sample plates for abrasion test, and specimens for Izod impact testing, and evaluated in the manner mentioned above. The test results are shown in Table 4.

COMPARATIVE EXAMPLE 3

Thermoplastic polyimide resin powder having the structure of formula (5) (AURUM PD450; trade name of the product manufactured by Mitsui Chemicals, Inc.) and mica (S-200; trade name of the product manufactured by Repco Inc.) were formulated in the ratio shown in Table 4, then well mixed in a tumbler mixer, further mixed in melt in a double-screw extruder (screw diameter: 37 mm; L/D=32 ) at 420° C. and at a screw revolution of 80 rpm, and extruded therefore to give pellets. The thus-extruded pellets were then molded into IC trays, sample plates for abrasion test, and specimens for Izod impact testing, and was evaluated in the manner mentioned above. The test resultsare shown in Table 4.

COMPARATIVE EXAMPLE 4

Thermoplastic polyimide resin powder having the structure of formula (5) (AURUM PD450; trade name of the product manufactured by Mitsui Chemicals, Inc.) and polytetrafluoroethylene (PTFE KTL610; trade name of the product manufactured by Kitamura Co.) were formulated in the ratio shown in Table 4, then well mixed in a tumbler mixer, further mixed in melt in a double-screw extruder (screw diameter: 37 mm; L/D=32) at 420° C. and at a screw revolution of 80 rpm, and extruded therefore to give pellets. The thus-extruded pellets were then molded into IC trays and sample plates for abrasion test, and specimens for Izod impact testing, and was evaluated in the manner mentioned above. The test results are shown in Table 4.

COMPARATIVE EXAMPLE 5

Thermoplastic polyimide resin powder having the structure of formula (5) (AURUM PD450; trade name of the product manufactured by Mitsui Chemicals, Inc.), carbon fiber (Besfight HTA-C6; trade name of the product manufactured by Toho Rayon Co.) and mica (S-200; trade name of the product manufactured by Repco Inc.) were formulated in the ratio shown in Table 5, then well mixed in a tumbler mixer, further mixed in melt in a double-screw extruder (screw diameter: 37 mm; L/D=32) at 420° C. and at a screw revolution of 80 rpm, and extruded therefore to give pellets. In this extrusion, the carbon fiber was fed into the extruder through a side feeder. The thus-extruded pellets were then molded into IC trays, sample plates for abrasion test, and specimens for Izod impact testing, and was evaluated in the manner mentioned above. The test results are shown in Table 5.

COMPARATIVE EXAMPLE 6

Thermoplastic polyimide resin powder having the structure of formula (5) (AURUM PD450; trade name of the product manufactured by Mitsui Chemicals, Inc.), carbon fiber (Besfight HTA-C6; trade name of the product manufactured by Toho Rayon Co.) and polytetrafluoroethylene (PTFE KTL610; trade name of the product manufactured by Kitamura Co.) were formulated in the ratio shown in Table 5, then well mixed in a tumbler mixer, further mixed in melt in a double-screw extruder (screw diameter: 37 mm; L/D= 32) at 420° C. and at a screw revolution of 80 rpm, and extruded therefore to give pellets. In this extrusion, the carbon fiber was fed into the extruder through a side feeder. The thus-extruded pellets were then molded into IC trays, sample plates for abrasion test, and specimens for Izod impact testing, and was evaluated in the manner mentioned above. The test results are shown in Table 5.

COMPARATIVE EXAMPLE 7

Thermoplastic polyimide resin powder having the structure of formula (5) (AURUM PD450; trade name of the product manufactured by Mitsui Chemicals, Inc.), mica (S-200; trade name of the product manufactured by Repco Inc.) and polytetrafluoroethylene (PTFE KTL610; trade name of the product manufactured by Kitamura Co.) were formulated in the ratio shown in Table 5, then well mixed in a tumbler mixer, further mixed in melt in a double-screw extruder (screw diameter: 37 mm; L/D=32) at 420° C. and at a screw revolution of 80 rpm, and extruded therefore to give pellets. The thus-extruded pellets were then molded into IC trays, sample plates for abrasion test, specimens for Izod impact testing, and was evaluated in the manner mentioned above. The test results are shown in Table 5.

COMPARATIVE EXAMPLE 8

The same procedure and tests as in Example 5 was repeated except that the components were formulated in the ratio as shown in Table 5.

COMPARATIVE EXAMPLE 9

The same procedure and tests as in Example 6 was repeated except that the components were formulated in the ratio as shown in Table 6.

COMPARATIVE EXAMPLE 10

The same procedure and tests as in Example 5 was repeated except that polyether-ether-ketone resin (PEEK 150P; trade name of the product manufactured by VICTREX Co.) was used in place of the thermoplastic polyimide resin and that the extrusion temperature was 390° C.

COMPARATIVE EXAMPLE 11

The same procedure and tests as in Example 5 was repeated except that polyether-imide resin (ULTEM 1000; trade name of the product manufactured by General Electric Co.) was used in place of the thermoplastic polyimide resin and that the extrusion temperature was 380° C.

COMPARATIVE EXAMPLE 12

The same procedure and tests as in Example 5 was repeated except that polyphenylene-ether resin (PPO; trade name of the product manufactured by GEM Polymer Co.) was used in place of the thermoplastic polyimide resin and that the extrusion temperature was 320° C.

TABLE 1

|  | Example | | | |
| --- | --- | --- | --- | --- |
|  | 1 | 2 | 3 | 4 |
| Composition/wt |  |  |  |  |
| Thermoplastic polyimide | 100 | 100 | 100 | 100 |
| Carbon fiber | 5 | 10 | 20 | 30 |
| Mica | 5 | 10 | 20 | 30 |
| PTFE | 1 | 10 | 10 | 10 |
| Logarithmic viscosity of polyimide (dl/g) | 0.47 | 0.47 | 0.47 | 0.47 |
| Impact resistance | ◯ | ◯ | ◯ | ◯ |
| Warpage r.t. (mm) | 0.1 | 0.1 | 0.1 | 0.1 |

TABLE 1-continued

| | Example | | | |
|---|---|---|---|---|
| | 1 | 2 | 3 | 4 |
| 230° C. | | | | |
| once (mm) | 0.1 | 0.1 | 0.1 | 0.1 |
| 30 times (mm) | 0.1 | 0.1 | 0.1 | 0.1 |
| Surface resistivity (Ω) | E11 | E8 | E7 | E7 |
| Mold releasing pressure (kg/cm2) | 45 | 25 | 15 | 20 |
| Wear (mg) | 8 | 10 | 10 | 12 |

TABLE 2

| | Example | | | | |
|---|---|---|---|---|---|
| | 5 | 6 | 7 | 8 | 9 |
| Composition/wt | | | | | |
| Thermoplastic polyimide | 100 | 100 | 100 | 100 | 100 |
| Carbon fiber | 40 | 40 | 50 | 60 | 70 |
| Mica | 40 | 40 | 50 | 60 | 40 |
| PTFE | 10 | 10 | 30 | 10 | 10 |
| Logarithmic viscosity of polyimide (dl/g) | 0.47 | 0.47 | 0.47 | 0.47 | 0.47 |
| Impact resistance | ○ | ○ | ○ | ○ | ○ |
| Warpage r.t. (mm) | 0.1 | 0.2 | 0.2 | 0.2 | 0.2 |
| 230° C. | | | | | |
| once (mm) | 0.1 | 0.2 | 0.2 | 0.2 | 0.2 |
| 30 times (mm) | 0.1 | 0.2 | 0.2 | 0.2 | 0.2 |
| Surface resistivity (Ω) | E6 | E6 | E5 | E4 | E3 |
| Mold releasing pressure (kg/cm2) | 23 | 23 | 15 | 28 | 30 |
| Wear (mg) | 12 | 10 | 12 | 15 | 13 |

TABLE 3

| | Example | | |
|---|---|---|---|
| | 10 | 11 | 12 |
| Composition/wt | | | |
| Thermoplastic polyimide | 100 | 100 | 80 |
| PEEK | — | — | 20 |
| Carbon fiber | 40 | 40 | 40 |
| Mica | 40 | 40 | 40 |
| PTFE | 10 | 10 | 10 |
| Logarithmic viscosity of polyimide (dl/g) | 0.35 | 0.60 | 0.47 |
| Impact resistance | ○ | ○ | ○ |
| Warpage r.t. (mm) | 0.1 | 0.2 | 0.1 |
| 230° C. | | | |
| once (mm) | 0.1 | 0.2 | 0.3 |
| 30 times (mm) | 0.1 | 0.2 | 0.3 |
| Surface resistivity (Ω) | E6 | E6 | E6 |
| Mold releasing pressure (kg/cm2) | 25 | 23 | 23 |
| Wear (mg) | 14 | 10 | 12 |

TABLE 4

| | Comparative Example | | | |
|---|---|---|---|---|
| | 1 | 2 | 3 | 4 |
| Composition/wt | | | | |
| Thermoplastic polyimide | 100 | 100 | 100 | 100 |
| Carbon fiber | — | 40 | — | — |
| Mica | — | — | 40 | — |
| PTFE | — | — | — | 10 |
| Carbon black | 10 | — | — | — |
| Logarithmic viscosity of polyimide (dl/g) | 0.47 | 0.47 | 0.47 | 0.47 |
| Impact resistance | X | ○ | X | ○ |
| Warpage r.t. (mm) | 0.1 | 2.0 | 0.1 | 0.1 |
| 230° C. | | | | |
| once (mm) | 0.1 | 4.0 | 0.1 | 0.2 |
| 30 times (mm) | 0.3 | 4.2 | 0.1 | 0.3 |
| Surface resistivity (Ω) | E6 | E6 | >E12 | >E12 |
| Mold releasing pressure (kg/cm2) | 80 | 60 | 50 | 20 |
| Wear (mg) | 35 | 20 | 25 | 25 |

TABLE 5

| | Comparative Example | | | |
|---|---|---|---|---|
| | 5 | 6 | 7 | 8 |
| Composition/wt | | | | |
| Thermoplastic polyimide | 100 | 100 | 100 | 100 |
| Carbon | 40 | 40 | — | 40 |
| Mica | 40 | — | 40 | 40 |
| PTFE | — | 10 | 10 | 70 |
| Logarithmic viscosity of polyimide (dl/g) | 0.47 | 0.47 | 0.47 | 0.47 |
| Impact resistance | ○ | ○ | X | X |
| Warpage r.t. (mm) | 0.5 | 1.1 | 0.1 | 0.1 |
| 230° C. | | | | |
| once (mm) | 0.5 | 2.2 | 0.1 | 0.1 |
| 30 times (mm) | 0.5 | 2.4 | 0.1 | 0.1 |
| Surface resistivity (Ω) | E6 | E6 | >E12 | E7 |
| Mold releasing pressure (kg/cm2) | 60 | 23 | 20 | 8 |
| Wear (mg) | 25 | 8 | 25 | 35 |

TABLE 6

| | Comparative Example | | | |
|---|---|---|---|---|
| | 9 | 10 | 11 | 12 |
| Composition/wt | | | | |
| Thermoplastic polyimide | 100 | — | — | — |
| PEEK | — | 100 | — | — |
| PEI | — | — | 100 | — |
| PPE | — | — | — | 100 |
| Carbon fiber | 80 | 40 | 40 | 40 |
| Mica | 110 | 40 | 40 | 40 |
| PTFE | 20 | 10 | 10 | 10 |
| Logarithmic viscosity of polyimide (dl/g) | 0.47 | — | — | — |
| Impact resistance | impossible to mold | ○ | ○ | ○ |
| Warpage r.t. (mm) | — | 0.1 | 0.1 | 0.1 |
| 230° C. | | | | |
| once (mm) | — | 2.6 | >10 | >10 |
| 30 times (mm) | — | 5.3 | >10 | >10 |
| Surface resistivity (Ω) | — | E6 | E6 | E6 |
| Mold releasing pressure (kg/cm2) | — | 24 | 23 | 23 |
| Wear (mg) | — | 12 | 40 | 50 |

What is claimed is:

1. A returnable IC tray having heat-resistant property, which is obtained by molding a resin composition comprising components (A), (B), (C) and (D), wherein, component (A) is a resin composition comprising a thermoplastic polyimide resin,
component (B) is carbon fiber,
component (C) is mica,
component (D) is an internal mold-releasing agent, and, relative to 100 parts by weight of component (A),
component (B) is from 1 to 80 parts by weight,
component (C) is from 1 to 100 parts by weight, and
component (D) is from 0.1 to 50 parts by weight.

2. An IC tray substantially free from warpage after exposure to temperatures of up to about 235° C., which is obtained by molding a resin composition comprising components (A), (B), (C) and (D), wherein component (A) is a resin composition comprising a thermoplastic polyimide resin,
component (B) is carbon fiber,
component (C) is mica,
component (D) is an internal mold-releasing agent, and, relative to 100 parts by weight of component (A),
component (B) is from 1 to 80 parts by weight,
component (C) is from 1 to 100 parts by weight, and
component (D) is from 0.1 to 50 parts by weight.

* * * * *